UNITED STATES PATENT OFFICE 2,580,528

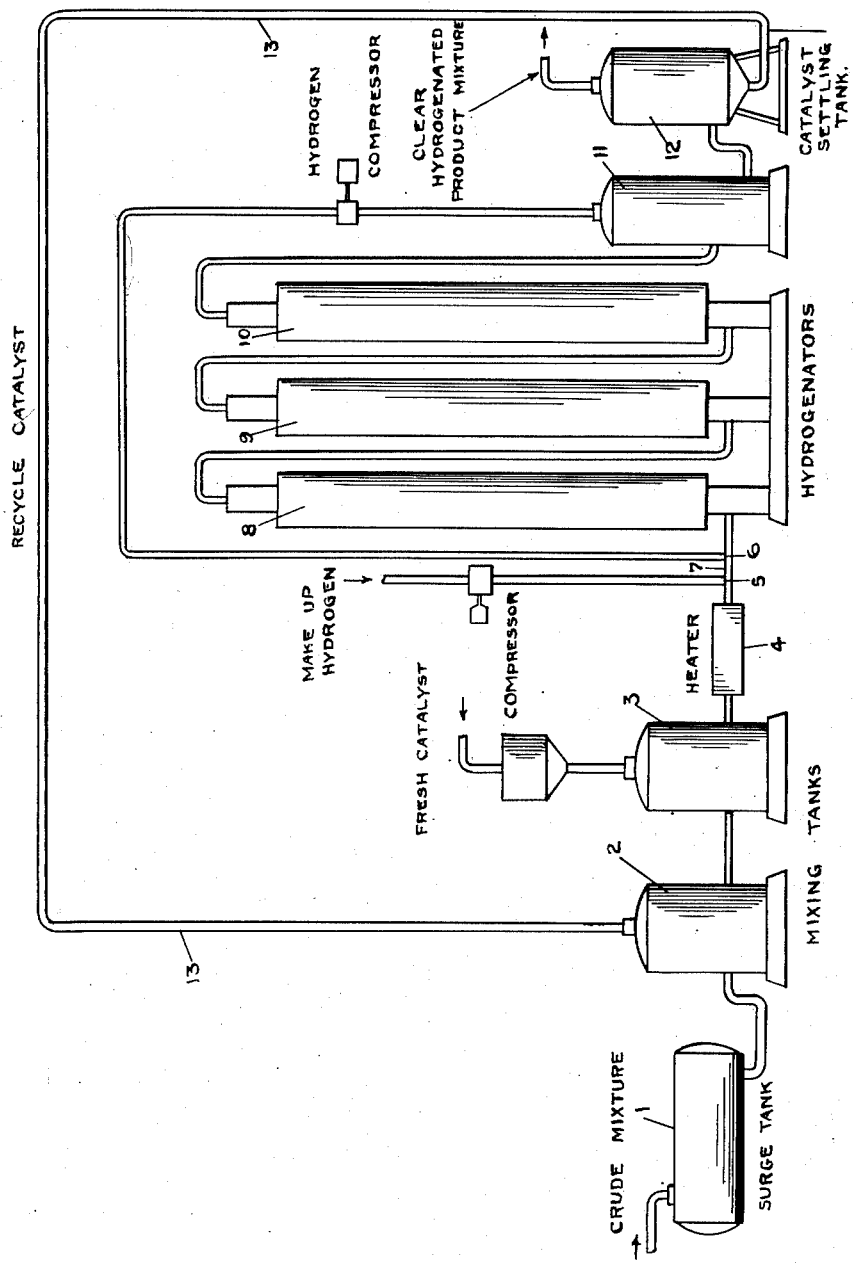

HYDROGENATION

Henry K. Dice, Samuel B. Jeffries, Jr., and Warren D. Hull, Corpus Christi, Tex., assignors to Celanese Corporation of America, a corporation of Delaware Application June 14, 1948, Serial No. 32,814

2 Claims. (Cl. 260—452)

This invention relates to the separation and purification of reaction mixtures and relates more particularly to an improved process for the separation and purification of a fraction of the mixture of oxygenated reaction products obtained by the vapor phase partial oxidation of gaseous, aliphatic hydrocarbons, such as, for example, butane or propane, with air or oxygen.

An object of this invention is the provision of an improved process for the efficient and economical separation and purification of a fraction of the mixture of aliphatic compounds obtained during the vapor phase partial oxidation of gaseous, aliphatic hydrocarbons, such as propane or butane, whereby difficulty separable higher aldehydes may be removed therefrom.

Other objects of this invention will appear from the following detailed description and the accompanying drawing.

In the drawing, the figure is schematic diagram or flow-sheet of our novel process.

The vapor phase, partial oxidation of aliphatic hydrocarbons such as propane or butane, or mixtures thereof, employing air or oxygen as the oxidizing agent, yields a complex mixture of products including formaldehyde, acetaldehyde, methanol, propanols, butanols, propionaldehyde, allyl alcohol, acetone, methyl ethyl ketone, methylal, acrolein, tetrahydrofuran, various aliphatic oxides, methyl formate and other esters, formals and acetals, as well as small amounts of numerous other aliphatic compounds. In order to separate the complex mixture of oxidation products and to purify each of the components so that the same will be suitable for commercial use, an intricate product purification scheme is necessary. Many of the oxidation products present in the mixture not only boil within a relatively narrow temperature range but numerous constant boiling azeotropes are also formed which makes an efficient and economical separation even more difficult. One such fraction which is obtained during the process comprises a mixture of acetone, methyl ethyl ketone, some acetaldehyde and a number of lower aliphatic alcohols, such as methanol, the propanols and butanols together with various oxides and acetals. This fraction also contains a number of higher boiling complex aldehydes difficult to remove therefrom by ordinary distillation operations. These complex aldehydes tend to remain as impurities in several of the products contained in the abovementioned mixture through the subsequent separation procedure. Consequently, the production of solvents and intermediates of high purity and capable of meeting exacting specifications is quite difficult.

We have now found that the purification and separation of the fraction of the mixture of oxidation products obtained by the vapor phase partial oxidation of gaseous hydrocarbons, such as propane or butane, and containing said higher boiling complex aldehydes may be effected with increased efficiency and the valuable organic compounds contained therein obtained in greater purity if the fraction containing the acetone, methyl ethyl ketone, acetaldehyde and alcohols, together with the various oxides, acetals and said higher boiling complex aldehydes is subjected to hydrogenation and the hydrogenated products obtained then separated by a combination of fractionation and extraction operations, in the usual manner, into the individual ketones and alcohols comprising the same. We have found that the conversion of the higher aldehydes to hydroxy compounds by hydrogenation during the intermediate stages of the purification process yields products capable of being separated relatively easily from the lower aliphatic alcohols and ketones comprising the major components of the mixture. As a result, these alcohols and ketones are obtained in greatly increased purity and, due to the ease of separation, in substantially higher yields.

The hydrogenation is preferably effected with the aid of a hydrogenation catalyst, such as Raney nickel, employing free, gaseous hydrogen under a pressure of 300 to 2000 pounds per square inch. The temperature of the reaction mixture during hydrogenation is preferably held at from about 150 to 250° F. with the pH of the mixture undergoing hydrogenation maintained at from 5.0 to 7.0, since below a pH of 5 the hydrogenation does not proceed satisfactorily. From 3 to 12% by weight of nickel hydrogenation catalyst on the weight of the mixture undergoing hydrogenation is preferred. The hydrogenation of the aldehydes present in the mixture is usually completed under these conditions in from about 1 to 2 hours. Hydrogenation of a part of the ketones present also takes place while the aldehydes are being reduced but the hydrogenation should not be continued to the point where the reduction of excessive amounts of the ketones present takes place since the ketones are relatively more valuable than the secondary alcohols obtained as ketone reduction products. Upon completion of the desired degree of hydrogenation, the hydrogenated products are introduced into settling tanks and the finely-divided catalyst present in the hydrogenated products is allowed to settle out. The supernatant liquid mixture is then subjected to a series of fractional distillation and extraction operations whereby it is separated into its various components, i. e. acetone, methyl ethyl ketone, methanol, tetrahydrofuran, n-propanol, isopropanol and the butanols.

The hydrogenation may be carried out very conveniently and effectively by mixing the mixture to be hydrogenated with the desired amount of hydrogenation catalyst and passing the mixture obtained through a number of vertical towers, in series, while simultaneously introducing hydrogen under pressure, in an amount sufficient to effect the desired hydrogenation, into the base of the first tower of the series. Preferably, an excess of hydrogen is employed and the flow rate of both the hydrogen and the mixture of catalyst and products undergoing hydrogenation so correlated that sufficient hydrogen will be present to effect the desired degree of hydrogenation while, at the same time, the excess hydrogen will be available for recycle so that the necessary degree of turbulence will be maintained to prevent any settling of the catalyst. The excess hydrogen also acts to maintain the desired pressure on the system since part of the hydrogen is absorbed during the hydrogenation which acts to reduce the pressure.

In order further to illustrate our invention, but without being limited thereto, the following example is given:

Example

An aqueous mixture of aliphatic compounds obtained as a fraction of the product of the vapor phase partial oxidation of a mixture of propane and butane with air, and comprising essentially a mixture of acetone, methyl ethyl ketone, acetaldehyde, lower aliphatic alcohols, such as methanol, n-propanol, isopropanol, n-butanol, isobutanol, and various oxides and acetals, and containing difficultly separable higher boiling complex aldehydes is fed to a surge tank 1. Hydrogenation of the mixture is effected after adding a total of 3% by weight of Raney nickel to the mixture. A part of the catalyst is added in a mixing tank 2, and constitutes recycled catalyst, while the remainder is added in a mixing tank 3 and comprises fresh catalyst. The mixture is heated to a temperature of 200° F. in heater 4, the pH being held at about 5.8, and is then passed through a series of vertical hydrogenators at a rate of about 99 parts by weight per minute. Make-up and recycle hydrogen is introduced into the heated mixture at 5 and 6 respectively as the mixture passes through a line 7 into the first tube 8 of the series. The hydrogen is introduced at a rate of 1 part by weight per minute and under a pressure of about 800 pounds per square inch. The hydrogen is dispersed by being forced to pass through perforated plates set in the base of each vertical hydrogenator tube. The hydrogenation reaction is initiated in tube 8 and continues in hydrogenation tubes 9 and 10. The flow of liquid and hydrogen is correlated to the tube dimensions so that a superficial gas velocity of about 0.005 foot per second is maintained in the tubes. An effective hydrogenation reaction period or contact time of about 1 hour is employed, this period of time allowing complete hydrogenation of the aldehydes but avoiding excessive hydrogenation of the ketones present. The rate of hydrogen feed employed is, as stated, in excess of that required to effect the desired hydrogenation. However, since the reaction time is controlled by the flow rate through the reactors, the excess acts merely to maintain the system at the desired 800 pounds per square inch pressure and is continuously recycled to provide the desired agitation.

The hydrogenation products are removed after the desired hydrogenation has been effected, the hydrogen separated out in a tank 11 and recycled and the liquid mixture passed to a settling tank 12 where the catalyst is allowed to settle out. The catalyst is then recycled through a line 13. The clear hydrogenated liquid is then passed to a surge tank (not shown) from which it is removed as desired and separated into the several components present therein by suitable distillation and extraction operations. Acetone, methanol, methyl ethyl ketone and tetrahydrofuran of a higher degree of purity and freedom from excess oxidizable matter are obtained than is possible where the hydrogenation step is not employed.

It is to be understood that the foregoing detailed description is given merely by way of illustration and that many variations may be made therein without departing from the spirit of our invention.

Having described our invention, what we desire to secure by Letters Patent is:

1. In a process for the treatment of a mixture comprising essentially acetone, methyl ethyl ketone, acetaldehyde, alcohols, oxides, acetals, and higher complex aldehydes, the step which comprises subjecting the mixture maintained at a pH of 5.0 to 7.0 and at a temperature of 150° to 250° F. to catalytic hydrogenation with free hydrogen under a pressure of 300 to 2000 pounds per square inch employing nickel as the hydrogenation catalyst, so as to cause the reduction of the higher aldehydes and a part of the ketones present to hydroxy compounds and separating the hydrogenated mixture obtained into the individual components comprising the same.

2. In a process for the treatment of a mixture comprising essentially acetone, methyl ethyl ketone, acetaldehyde, alcohols, oxides, acetals, and higher complex aldehydes, the step which comprises subjecting the mixture maintained at a pH of 5.0 to 7.0 and at a temperature of 150 to 250° F. to catalytic hydrogenation with free hydrogen under a pressure of 300 to 2000 pounds per square inch employing nickel as the hydrogenation catalyst in an amount of from 3 to 12% by weight on the weight of the mixture being hydrogenated so as to cause the reduction of the higher aldehydes and a part of the ketones present to hydroxy compounds and then separating the hydrogenated mixture obtained into the individual components comprising the same.

HENRY K. DICE.
SAMUEL B. JEFFRIES, Jr.
WARREN D. HULL.

REFERENCES CITED

The following references are of record in the file of this patent:

UNITED STATES PATENTS

| Number | Name | Date |
|---|---|---|
| 1,588,836 | James | June 15, 1926 |
| 1,681,238 | James | Aug. 21, 1928 |
| 1,921,381 | Beller et al. | Aug. 8, 1933 |
| 2,048,662 | Luther et al. | July 21, 1936 |
| 2,121,368 | Schiller | June 21, 1938 |